(12) United States Patent
Saitoh

(10) Patent No.: US 7,139,062 B2
(45) Date of Patent: Nov. 21, 2006

(54) DISPLAY PANEL ASSEMBLY, DISPLAY PANEL CASE, DISPLAY PANEL MODULE, PROJECTION DISPLAY DEVICE, AND COOLING METHOD FOR THE DISPLAY PANEL MODULE

(75) Inventor: Hiromi Saitoh, Chino (JP)

(73) Assignee: Seiko Epson Corporation, Tokyo (JP)

( * ) Notice: Subject to any disclaimer, the term of this patent is extended or adjusted under 35 U.S.C. 154(b) by 82 days.

(21) Appl. No.: 10/446,825

(22) Filed: May 29, 2003

(65) Prior Publication Data

US 2003/0231271 A1 Dec. 18, 2003

(30) Foreign Application Priority Data

Jun. 7, 2002 (JP) .............................. 2002-167778

(51) Int. Cl.
*G02F 1/1333* (2006.01)
(52) U.S. Cl. .......................... 349/161; 349/58; 353/54
(58) Field of Classification Search ................ 349/161, 349/58, 156, 189, 190, 54
See application file for complete search history.

(56) References Cited

U.S. PATENT DOCUMENTS

| 4,763,993 | A | * | 8/1988 | Vogeley et al. ............. 349/161 |
| 5,936,696 | A | * | 8/1999 | Daijogo et al. ............. 349/161 |
| 6,411,360 | B1 | * | 6/2002 | Matsuyama et al. ........ 349/156 |
| 6,535,267 | B1 | * | 3/2003 | Numata et al. ............. 349/161 |
| 6,643,067 | B1 | * | 11/2003 | Miyamae et al. ........... 359/619 |

FOREIGN PATENT DOCUMENTS

| JP | A 04-125538 | 4/1992 |
| JP | A 05-181110 | 7/1993 |
| JP | A-08043805 | 2/1996 |
| JP | A 09-120048 | 6/1997 |
| JP | A 10-319379 | 12/1998 |
| JP | A-249120 | 9/1999 |
| JP | A 2000-284700 | 10/2000 |
| JP | A 2001-264754 | 9/2001 |
| JP | A-2001-265236 | 9/2001 |
| JP | A 2001-330812 | 11/2001 |
| JP | A 2002-040389 | 2/2002 |
| JP | A 2002-139723 | 5/2002 |

* cited by examiner

Primary Examiner—David Neims
Assistant Examiner—(Nancy) Thanh-Nhan P Nguyen
(74) Attorney, Agent, or Firm—Oliff & Berridge, PLC

(57) ABSTRACT

The invention provides a display panel, a transparent member placed on at least one of an incident surface and an emergent surface of the display panel, and a gap member placed between at least one of the display panel and the transparent member to form a gap therebetween. Accordingly, the effect of cooling the liquid crystal panel, the transparent member, and a display panel case is enhanced to extend the lifetime of the device and to reduce noise.

24 Claims, 6 Drawing Sheets

DISPLAY PANEL ASSEMBLY, DISPLAY PANEL CASE, DISPLAY PANEL MODULE, PROJECTION DISPLAY DEVICE, AND COOLING METHOD FOR THE DISPLAY PANEL MODULE

BACKGROUND OF THE INVENTION

1. Field of Invention

The present invention relates to a display panel assembly suitable for devices using a liquid crystal panel for display control, a display panel case, a display panel module, a projection display device, and a cooling method for the display panel module.

2. Description of Related Art

A liquid crystal panel has a structure in which liquid crystal is sealed between two substrates, such as glass substrates or quartz substrates. In the liquid crystal panel, active elements, such as thin film transistors (hereinafter "TFTs"), are arranged in a matrix on one of the substrates, and a counter electrode is placed on the other substrate. Image display can be performed by changing the optical characteristic of the liquid crystal layer sealed between the substrates according to an image signal.

That is, an image signal is supplied to each of pixel electrodes arranged in a matrix by a TFT element, and a voltage based on the image signal is applied to the liquid crystal layer between the pixel electrode and the counter electrode, thereby changing the alignment of liquid crystal molecules. The transmittance of the pixel is thereby changed, and light passing through the pixel electrode and the liquid crystal layer is changed according to the image signal to perform image display.

Such a liquid crystal panel can be used as a light valve that receives light from a light source to form a predetermined image in a projection display device. An image formed by the liquid crystal panel is enlarged and projected on a screen or the like by a projection optical system of the projection display device.

In this way, in the projection display device, an image on an image plane of the liquid crystal panel is enlarged and projected on the screen. Therefore, when dust adheres to the image plane of the liquid crystal panel, the quality of a display image is significantly lowered by the influence of the dust. Accordingly, a dustproof panel is attached to at least an incident surface of the liquid crystal panel in order to reduce the influence of dust and the like by a defocusing effect.

In the projection display device, in general, a liquid crystal panel assembly in which a dustproof panel is attached to a liquid crystal panel is housed in a case made of synthetic resin, metal, or the like, and is mounted inside a housing of the device from the standpoints of strength, mounting accuracy, and so on.

The dustproof panel and the liquid crystal panel are fixed by adhesive. Furthermore, a gap between side faces of the liquid crystal panel and inner walls of the case is sealed with adhesive to fixedly bond the liquid crystal panel to the case.

An opening is formed at the bottom center of the case corresponding to an effective display region of the liquid crystal panel. Light incident from the opening is transmitted by the liquid crystal panel through the dustproof panel, and is then emitted. A flexible print board is fixed to mounting terminals provided at the substrate end of the liquid crystal panel by pressure.

SUMMARY OF THE INVENTION

In the projection display device, it can be advantageous to increase luminance. With such an increase of luminance, heat produced in the liquid crystal panel and the like is increased. Heat produced in the liquid crystal panel and the dustproof panel are radiated through the case. However, since air lies in most portions between the case, and the liquid crystal and the dustproof panel, radiation efficiency is low.

For this reason, it is advantageous to forcibly perform cooling with a cooling fan. In order to increase the volume of air from the cooling fan, the power consumption is increased, and noise during operation is increased.

The present invention addresses or solves the above and/or other problems, and provides a display panel assembly in which a cooling effect can be enhanced by forming a fluid channel therein, a display panel case, a display panel module, a projection display device, and a cooling method for the display panel module.

A display panel assembly according to the present invention includes a display panel, a transparent member placed on at least one of an incident surface and an emergent surface of the display panel, and a gap member placed between at least one of the display panel and the transparent member to form a gap therebetween.

In such a configuration, a gap is formed between at least one of the display panel and the transparent member by the gap member. The gap faces the surfaces of the display panel and the transparent member, and functions as a path to radiate heat from the display panel and the transparent member. By letting cooling fluid flow in the gap, the display panel and the transparent member can be cooled extremely effectively.

The display panel assembly of the present invention further includes an adhesive member to bond the incident surface and/or the emergent surface of the display panel to the transparent member.

In such a structure, the flow of the fluid can be regulated by the adhesive member, and the cooling effect can be enhanced.

The adhesive member is formed on the periphery of the incident surface and/or the emergent surface of the display panel, except for a part, to allow the gap to serve as a channel for the fluid.

In such a structure, the adhesive member is formed on the periphery of the incident surface and/or the emergent surface of the display panel except for a part, so that an inlet and outlet for the fluid is formed in the gap. That is, the gap serves as a part of a fluid channel, cooling fluid efficiently flows in the gap, and the cooling effect is enhanced.

The part in which the adhesive member is not formed includes two predetermined portions of the adhesive member.

In such a structure, the flow of the fluid is further regulated, for example, liquid can be used as the cooling fluid, and high-efficiency cooling is achieved by liquid cooling.

The part in which the adhesive member is not formed is provided on opposite side faces of the display panel.

In such a structure, the whole flow of the fluid is regulated to one direction, and is smoothened, so that the cooling effect is enhanced.

The display panel assembly of the present invention further includes an antireflection film formed on the surface of the display panel facing the gap between the display panel and the transparent member.

In such a structure, since light reflection is prevented by the antireflection film, a member having a refractive index different from that of the display panel can be used as the transparent member.

The transparent member is made of a glass material.

In such a structure, a glass material is used as the transparent member.

A display panel case of the present invention includes a housing section to accommodate the above display panel assembly, and a hole formed in the housing section to allow the gap in the display panel assembly to communicate with the outside.

In such a structure, the case can accommodate the display panel assembly in the housing section, and has a hole that allows the gap to communicate with the exterior. Consequently, the fluid can be caused to flow in the gap through the hole.

A display panel case of the present invention includes a housing section to accommodate the above display panel assembly, and a plurality of holes formed in the housing section to allow the gap to communicate with the outside through the part of the display panel assembly in which the adhesive member is not formed.

In such a structure, the holes can cause the gap that forms the fluid channel to communicate with the exterior. Therefore, by being caused to flow through the holes, the fluid efficiently flows in the gap, and can cool the display panel, the transparent member, and the display panel case.

A display panel module of the present invention includes the above display panel assembly, and the above display panel case.

In such a structure, since the display panel assembly has the gap and the case has the hole, the display panel, the transparent member, and the case can be efficiently cooled by connecting the gap and the outside through the hole and letting the fluid therein.

A display panel case of the present invention includes a housing section to accommodate a display panel, a plurality of openings formed on an outer surface of the housing section, and at least one duct formed in a thick portion of the housing section to form a predetermined channel, and connected at both ends to the openings.

In such a structure, the display panel is accommodated in the housing section. At least one dust that forms a predetermined channel is formed in the thick portion of the housing section. The duct is connected at both ends to a plurality of openings formed on the outer surface of the housing section. By letting fluid flow through the openings, the display panel case can be cooled efficiently.

The duct is provided on the periphery of the display panel.

In such a structure, since the duct is provided on the periphery of the display panel, a strong radiation effect for the display panel can be achieved.

A display panel case of the present invention includes a housing section to accommodate the display panel assembly, a hole formed in the housing section to allow the gap in the display panel assembly to communicate with the outside, a plurality of openings formed on an outer surface of the housing section, and at least one duct formed in a thick portion of the housing to form a predetermined channel, and connected at both ends to the openings.

In such a structure, the gap formed in the display panel assembly is caused by the hole to communicate with the outside to form a channel, and a channel communicating with the openings is formed in the housing section by at least one duct. By letting cooling fluid flow in these channels, the display panel assembly and the housing section can be cooled efficiently.

In a cooling method for a display panel module according to the present invention, the display panel module is cooled by letting liquid flow into the display panel module. The refractive index of the liquid corresponds to the refractive index of the transparent member that constitutes the display panel assembly.

In such a structure, since the refractive index of the liquid and the refractive index of the transparent member are similar, incident light is not reflected, and superior image display is possible.

A projection display device of the present invention includes the above display panel module as an image forming device.

In such a structure, the effect of cooling the display panel module is extremely strong. Since a cooling fan is unnecessary, it is possible to reduce the power consumption and to reduce noise.

DETAILED DESCRIPTION OF PREFERRED EMBODIMENTS

Figure 1:
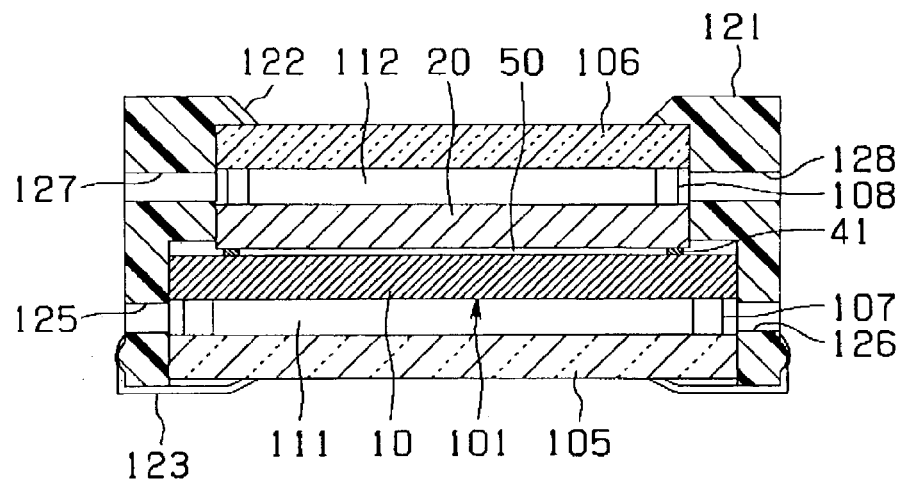
FIG. 1 is a schematic sectional view of a display panel module according to a first exemplary embodiment of the present invention.
Figure 2:
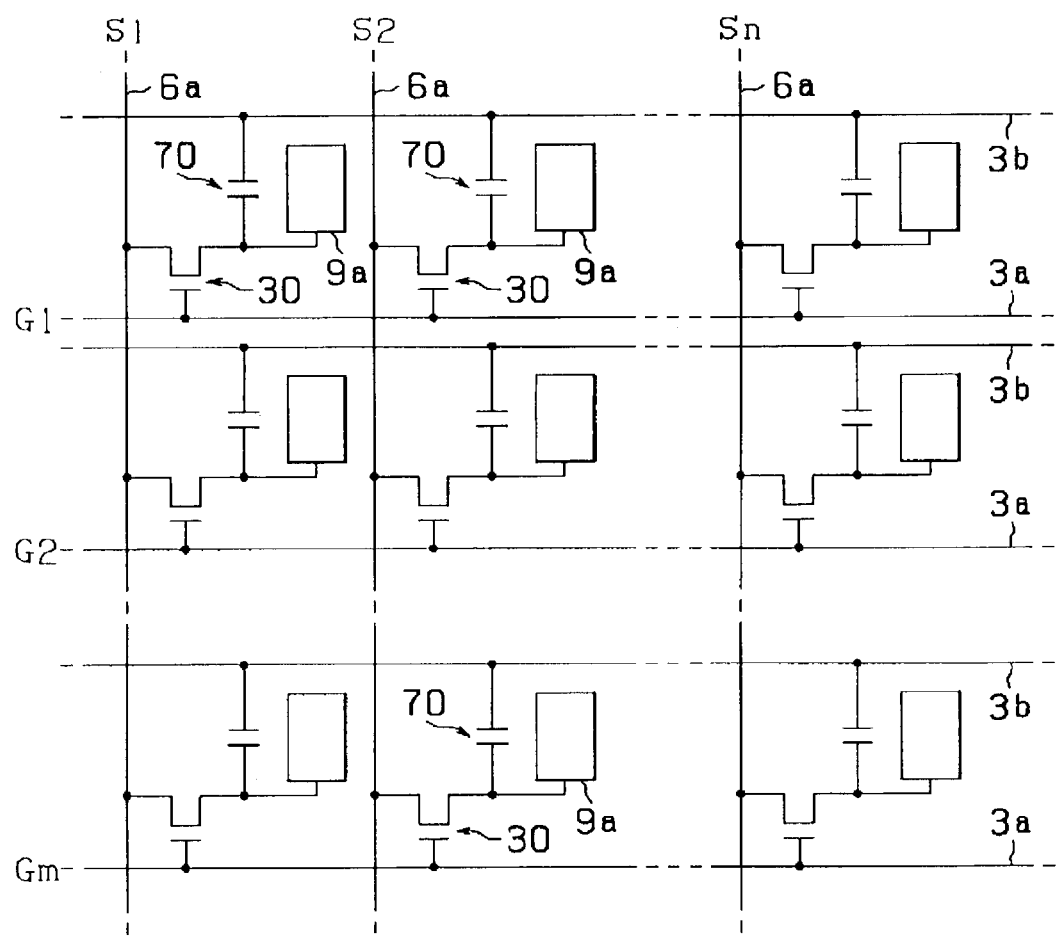
FIG. 2 is a schematic circuit diagram showing various elements, lines, and so on in a plurality of pixels that constitute a pixel region of a liquid crystal panel as a display panel.
Figure 3:
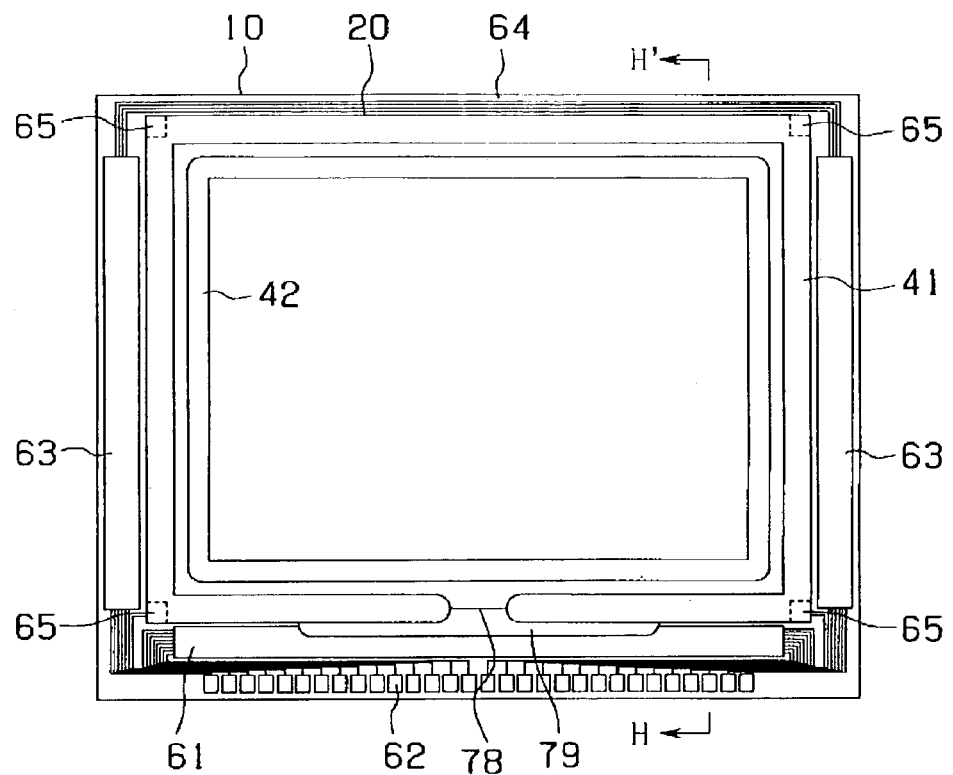
FIG. 3 is a plan view of a TFT substrate that constitutes the liquid crystal panel, and components formed thereon, as viewed from the side of a counter substrate.
Figure 4:
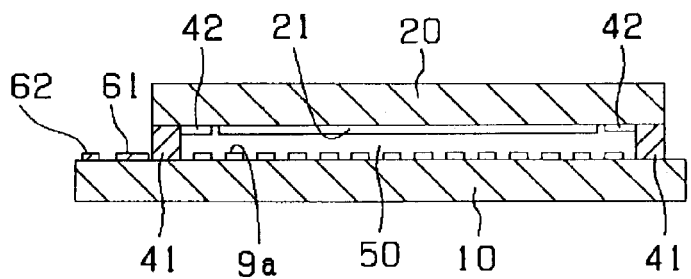
FIG. 4 is a cross-sectional view of a liquid crystal device taken along plane H–H' in FIG. 3, after an assembly process in which the TFT substrate and the counter substrate are bonded and liquid crystal is sealed therebetween.
Figure 5:
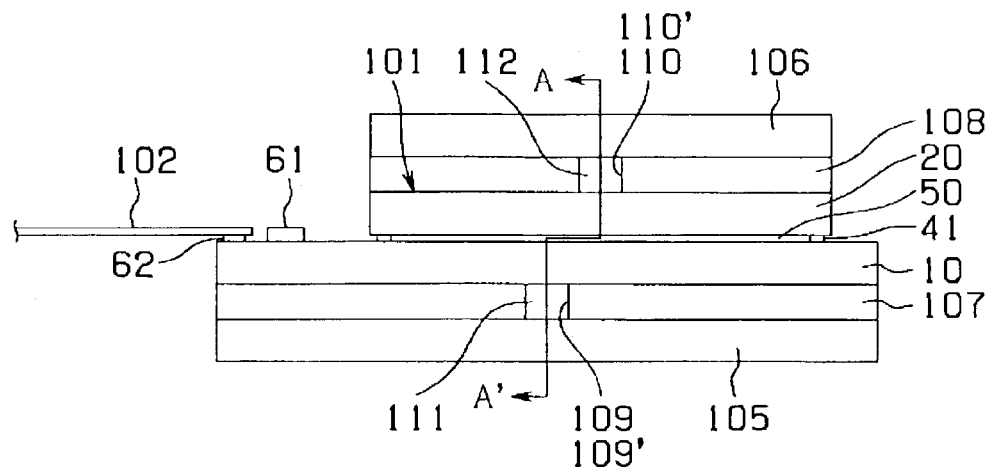
FIG. 5 is a schematic side view of a liquid crystal panel assembly serving as a display panel assembly constituted by the liquid crystal panel and dustproof panels.

Exemplary embodiments of the present invention are described below in detail with reference to the drawings. FIG. 1 is a schematic sectional view of a display panel module according to a first exemplary embodiment of the present invention. FIG. 2 is a schematic circuit diagram of various elements, lines, and so on in a plurality of pixels that constitute a pixel region of a liquid crystal panel serving as a display panel. FIG. 3 is a plan view of a TFT substrate that constitutes the liquid crystal panel, and components formed thereon, as viewed from the side of a counter substrate, and FIG. 4 is a cross-sectional view of a liquid crystal device taken along plane H–H' in FIG. 3, after an assembly process in which the TFT substrate and the counter substrate are bonded and liquid crystal is sealed therebetween. FIG. 5 is a schematic side view of a liquid crystal panel assembly serving as a display panel assembly composed of the liquid crystal panel and dustproof panels (transparent members), in which the liquid crystal panel is viewed from the same direction as that in FIG. 4. FIG. 1 shows a cross-section taken along plane A–A' in FIG. 5. The display panel module shown in FIG. 1 has a structure in which the display panel assembly is housed in a display panel case.

In this exemplary embodiment, gaps are formed between the liquid crystal panel and upper and lower dustproof panels, and the liquid crystal panel, the dustproof panels, the display panel case, and so on are forcibly cooled by air cooling or liquid cooling that is performed by causing air or liquid flow in the gaps used as fluid channels. The present invention is applicable not only to the liquid crystal panel, but also to various electrooptic panels (display panels), for example, EL (electroluminescence) panels, such as organic EL panels and inorganic EL panels.

First, the configuration of the liquid crystal panel is described below with reference to FIGS. 2 to 4.

As shown in FIGS. 3 and 4, the liquid crystal panel is formed by sealing liquid crystal 50 between a TFT substrate 10 and a counter substrate 20. Pixel electrodes and so on that constitute pixels are arranged in a matrix on the TFT substrate 10. FIG. 2 shows an equivalent circuit of elements on the TFT substrate 10 that constitute the pixels.

As shown in FIG. 2, a plurality of scanning lines 3a and a plurality of data lines 6a are arranged to cross each other in the pixel region. Pixel electrodes 9a are placed in a matrix in regions partitioned by the scanning lines 3a and the data lines 6a. TFTs 30 are provided corresponding to intersections of the scanning lines 3a and the data lines 6a, and the pixel electrodes 9a are connected to the TFTs 30.

Each TFT 30 is turned on in response to an ON signal from a scanning line 3a, and an image signal supplied to a data line 6a is thereby supplied to a pixel electrode 9a. A voltage between the pixel electrode 9a and a counter electrode 21 (see FIG. 4) provided on the counter substrate 20 is applied to the liquid crystal 50. A storage capacitor 70 is provided in parallel with the pixel electrode 9a. The storage capacitor 70 allows the voltage of the pixel electrode 9a to be maintained, for example, for a time period three digits longer than a time period during which a source voltage is applied thereto. The storage capacitor 70 can enhance the voltage holding characteristics and can achieve high-contrast image display.

As shown in FIGS. 3 and 4, the counter substrate 20 is provided with a shielding film 42 serving as a frame to define a display region. The shielding film 42 is made of, for example, a shielding material that is equal to or different from a shielding film that forms a black matrix provided on the counter substrate 20.

A sealing material 41 to seal liquid crystal is formed outside the shielding film 42 between the TFT substrate 10 and the counter substrate 20. The sealing material 41 is placed to be almost aligned with the outline of the counter substrate 20, and fixes the TFT substrate 10 and the counter substrate 20. The sealing material 41 does not lie in a part of one side of the TFT substrate 10 so that a liquid-crystal injection port 78 through which the liquid crystal 50 is injected is formed in a gap between the TFT substrate 10 and the counter substrate 20 bonded together. The liquid-crystal injection port 78 is sealed with a sealant 79 after liquid crystal is injected therefrom.

In a region of the TFT substrate 10 outside the sealing material 41, a data-line driving circuit 61 and mounting terminals 62 are provided along one side of the TFT substrate 10, and scanning-line driving circuits 63 are provided along two sides adjacent to the side. Along the remaining side of the TFT substrate 10, a plurality of lines 64 are provided to connect the scanning-line driving circuits 63 disposed on both sides of the image display region. A conductive material 65 is provided at least at one corner of the counter substrate 20 to electrically connect the TFT substrate 10 and the counter substrate 20.

A panel assembly process is described below. The TFT substrate 10 and the counter substrate 20 are produced separately. Polyimide (PI) serving as an alignment film (not shown) is applied onto a TFT substrate 10 and a counter substrate 20 prepared separately. Next, the alignment film on the TFT substrate 10 and the alignment film on the counter substrate 20 are subjected to rubbing. Subsequently, a cleaning step is performed. The cleaning step is performed to remove dust made by rubbing. When the cleaning step is completed, a sealing material 41 and a conductive material 65 (see FIG. 3) are formed.

The sealing material 41 to be adopted contains gap materials having a thickness of 2 μm to 3.5 μm (e.g., 3 μm). The sealing material 41 is formed on the periphery of the substrate by dispensing. The sealing material 41 may be formed by screen printing. After the sealing material 41 is formed, the TFT substrate 10 and the counter substrate 20 are bonded together, are press-bonded in alignment, and the sealing material 41 is set. Finally, liquid crystal is injected from a cutout formed in a part of the sealing material 41, and the cutout is closed to seal the liquid crystal.

An FPC (flexible printed circuit) is connected to the liquid crystal panel thus constructed, and dustproof panels are bonded thereto. FIG. 5 shows such a liquid crystal panel assembly composed of the liquid crystal panel and the dustproof panels.

An FPC 102 is connected to mounting terminals (see FIG. 3) of a liquid crystal panel 101. For example, the FPC 102 has a structure in which copper foil patterns (not shown) made of a rolled copper foil are formed on a base material, such as a polyimide film, and a cover material is formed on the copper foil patterns. The copper foil patterns are arranged side by side in the lengthwise direction of the FPC 102. An ACF (Anisotropic Conductive Film) (not shown) made of an adhesive containing conductive particles is formed in the widthwise direction of the FPC 102, and the FPC 102 is press-fixed to the TFT substrate 10 by using the ACF.

The TFT substrate 10 and the counter substrate 20 in the liquid crystal panel 101 are provided with dustproof panels 105 and 106, respectively. The dustproof panel 105 has a refractive index substantially equal to that of the TFT substrate 10, and preferably, is made of the same material as that of the TFT substrate 10. The dustproof panel 106 also has a refractive index substantially equal to that of the counter substrate 20, and preferably, is made of the same material as that of the counter substrate 20.

As shown in FIG. 5, in this exemplary embodiment, the TFT substrate 10 and the dustproof panel 105 are bonded by a sealing material 107 with a predetermined gap 111 therebetween. For example, a sealing material containing gap materials is used as the sealing material 107, the sealing material 107 is applied on the periphery of the TFT substrate 10, the TFT substrate 10 and the dustproof panel 105 are press-bonded, and the sealing material 107 is then set.

Similarly, the counter substrate 20 and the dustproof panel 106 are bonded by a sealing material 108 with a predetermined gap 112 therebetween. For example, a sealing material containing gap materials is used as the sealing material 108, the sealing material 108 is applied on the periphery of the counter substrate 20, the counter substrate 20 and the dustproof panel 106 are press-bonded, and the sealing material 108 is then set.

When the TFT substrate 10 and the counter substrate 20 are formed of a quartz substrate (refractive index=1.46), the dustproof panels 105 and 106 can have a refractive index equal to that of the substrates by being made of a similar quartz substrate.

When the quartz substrates are used, as described above, the sealing materials 107 and 108 may be made of an adhesive, such as a silicone adhesive or an acrylic adhesive, that is prepared to have a refractive index of 1.46 and that becomes transparent when set. Since the sealing materials 107 and 108 are formed outside the display region, it is not always necessary that they have a refractive index substantially equal to those of the substrates 10 and 20 and the dustproof panels 105 and 106 and they become transparent when set.

Of course, when the TFT substrate 10 and the counter substrate 20 are made of a highly heat-resistant glass plate having a refractive index of 1.54, for example, Neoceram, the dustproof panels 105 and 106 may be made of the same highly heat-resistant glass plate. For the sealing materials 107 and 108, the silicone adhesive or the acrylic adhesive may be prepared to have a refractive index of 1.54.

In this exemplary embodiment, a quartz substrate of 1.2 mm in thickness and a quartz substrate of 1.1 mm in thickness are used, as the TFT substrate 10 and the counter substrate 20, respectively, and quartz substrates of 1.1 mm in thickness are used as the dustproof panels 105 and 106. This produces a certain defocusing effect.

In this exemplary embodiment, the thickness of the sealing materials 107 and 108 is set at approximately 1 mm. This ensures such sufficient gaps that fluid can easily flow therein, between the TFT substrate 10 and the dustproof panel 105 and between the counter substrate 20 and the dustproof panel 106.

The distances from the display surface of the liquid crystal panel 101 to the outer surfaces of the dustproof panels 105 and 106 can be made more than or equal to approximately 3 mm, and this can produce a considerably strong defocusing effect.

In this exemplary embodiment, the sealing material 107 is partly lost on one side face of the liquid crystal panel 101 to form an opening 109. The sealing material 107 is also partly lost on a side face opposing the side face with the opening 109 to form an opening 109'. Similarly, the sealing material 108 is partly lost on one side face of the liquid crystal panel 101 to form an opening 110. The sealing material 108 is also partly lost on a side face opposing the side face with the opening 110 to form an opening 110'.

That is, the openings 109 and 109' allow the gap 111 surrounded by the sealing material 107 between the TFT substrate 10 and the dustproof panel 105 to communicate with the outside. The openings 110 and 110' allow the gap 112 surrounded by the sealing material 108 between the counter substrate 20 and the dustproof panel 106 to communicate with the outside. While the opening 109 and the opening 110 are positioned offset from each other in FIG. 5, they may be provided at the same position. This also applies to the positional relationship between the opening 109' and the opening 110'.

A step of bonding the TFT substrate 10 and the dustproof panel 105 and a step of bonding the counter substrate 20 and the dustproof panel 106 may be performed before or after panel assembly.

The liquid crystal panel assembly thus constructed is housed in a case. FIG. 1 shows this state.

The interior of a case 121 has a shape that almost conforms to the shape of the liquid crystal panel 101 and the dustproof panels 106 and 105 bonded together. The case 121 is a housing that is open at the bottom. The liquid crystal panel 101 and the dustproof panels 106 and 105 bonded with an adhesive are fixedly bonded inside the case 121. The case 121 has an opening 122 on its upper surface corresponding to the effective display region of the liquid crystal panel 101. The liquid crystal panel 101 is placed with the side of the counter substrate 20 pointing toward the upper surface.

A slight gap is formed between both horizontal side faces of the liquid crystal panel assembly including the liquid crystal panel 101 and the dustproof panels, and both inner side walls of the case 121 opposing the side faces. The gap is sealed with adhesive (not shown), and the adhesive fixedly bonds the liquid crystal panel assembly at a predetermined position inside the case 121.

By selecting, as the adhesive for bonding the liquid crystal panel assembly, an adhesive that maintains a predetermined elastic modulus even after being set, the liquid crystal panel 101 and the case 121 can be sufficiently fixed while enabling elastic displacement therebetween to increase the impact resistance. A rubber adhesive, such as silicon RTV (room temperature vulcanization silicone rubber), may be used as the adhesive.

In a state in which the liquid crystal panel 101 and the dustproof panels 106 and 105 bonded together are housed inside the case 121, the open bottom of the case 121 is closed by a hook 123. The hook 123 has an aperture corresponding to the effective display region of the TFT substrate 10.

In this exemplary embodiment, the case 121 has holes 125 to 128 communicating with the outside corresponding to the four openings 109, 109', 110 and 110' formed in the side faces of the liquid crystal panel assembly. The openings 109, 109', 110, and 110' face the holes 125 to 128, respectively, and are connected thereto in an airtight or watertight manner.

In this way, a fluid channel is formed by the hole 125, the opening 109, the gap 111, the opening 109', and the hole 126. Similarly, a fluid channel is formed by the hole 127, the opening 110, the gap 112, the opening 110', and the hole 128.

Next, a description is provided of an assembly method and a cooling method for the liquid crystal panel module shown in FIG. 1.

An FPC 102 is attached to a liquid crystal panel 101 having the same configuration as that of the liquid crystal panel shown in FIGS. 2 to 4. For example, the liquid crystal panel 101 and the FPC 102 are aligned with each other while marks (not shown) on the liquid crystal panel 101 and recognition marks (not shown) on the FPC 102 are detected by, for example, image recognition. The FPC 102 is press-fixed to the TFT substrate 10 by an ACF in a position such that copper foil patterns of the FPC 102 are connected to corresponding mounting terminals 62.

Next, sealing materials 107 and 108 are applied on a TFT substrate 10 and a counter substrate 20 in the liquid crystal panel 101, and dustproof panels 105 and 106 are bonded thereto with gaps 111 and 112 therebetween, respectively. A liquid crystal panel assembly thus formed is placed at a predetermined position in a case 121, and is then fixedly bonded. In this case, the liquid crystal panel assembly is placed so that openings 109, 109', 110, and 110' thereof face holes 125 to 128 of the case 121, respectively, and is bonded in a watertight or airtight manner.

In a case in which the liquid crystal panel 101 is used in a projection display device or the like, the case 121 having the liquid crystal panel assembly housed therein is fixed at a prescribed position inside the projection display device. In this exemplary embodiment, ducts through which cooling fluid flows are connected to the holes 125 and 126 of the case 121. Similarly, ducts through which cooling fluid flows are connected to the holes 127 and 128 of the cases 121. Cooling fluid is poured from one of the holes 125 and 126, and is sucked from the other hole. Similarly, cooling fluid is poured from one of the holes 127 and 128, and is sucked from the other hole.

The liquid crystal panel 101, the dustproof panels 105 and 106, and the case 121 are thereby cooled. That is, cooling fluid flows through the holes 125 and 126 to mainly cool the case 121, and flows in the gap 111 through the openings 109 and 109' to mainly cool the TFT substrate 10 and the dustproof panel 105. Similarly, cooling fluid flows through the holes 127 and 128 to mainly cool the case 121, and flows in the gap 112 through the openings 110 and 110' to mainly cool the counter substrate 20 and the dustproof panel 106.

Since the gap 111 faces the entire surfaces of the TFT substrate 10 and the dustproof panel 105 and the gap 112 faces the entire surfaces of the counter substrate 20 and the dustproof panel 106, the cooling effect is extremely strong.

It is possible to use liquid as the cooling fluid. A cooling liquid to be used has a refractive index substantially similar to those of the TFT substrate 10, the counter substrate 20, and the dustproof panels 105 and 106. For example, ethylene glycol (ethylene glycol dimethyl ether) having a refractive index of approximately 1.45 to 1.55 may be adopted as the cooling liquid. Silicone oil or the like is also applicable as the cooling liquid.

In both a case in which air is used as the cooling fluid and a case in which liquid is used, since the air or liquid flows in the gaps 111 and 112, dust will not adhere inside the gaps 111 and 112.

It is possible to use single-crystal sapphire as the material of the dustproof panels 105 and 106. The hardness of the single-crystal sapphire (Vickers hardness of 2300) is even higher than that of glass, in particular, high-strength quartz glass (Vickers hardness of 900). Moreover, the thermal conductivity of the single-crystal sapphire (42.0 W/m×K) is considerably higher than that of quartz glass (1.2 W/m×K). Consequently, the effect of radiating heat produced in the liquid crystal panel 101 can be made stronger than when dustproof panels made of glass are adopted.

In this way, in this exemplary embodiment, the gap 111 serving as the channel for cooling fluid is formed between the TFT substrate 10 and the dustproof panel 105, the gap 112 serving as the channel for cooling liquid is formed between the counter substrate 20 and the dustproof panel 106, and the openings 109, 109', 110, and 110' are formed to allow the holes 125 to 128 of the case 121 and the gaps 111 and 112 to communicate with each other. Cooling fluid can be thereby caused to flow in the gap 111 between the TFT substrate 10 and the dustproof panel 105 and in the gap 112 between the counter substrate 20 and the dustproof panel 106 through the holes 125 to 128 of the case 121. This can enhance the effect of cooling the liquid crystal panel assembly and the case 121 in order to achieve a strong cooling effect. Therefore, it is possible to reduce the volume of air from the cooling fan, to reduce the power consumption, and to reduce noise due to the cooling fan.

While the openings 109, 109', 110, and 110' and the holes 125 to 128 are formed on one side face of the liquid crystal panel module and the side face opposing the one side face in the first embodiment, they may be formed on one side face and an adjacent side face. It is obvious that the openings and holes may be formed on any faces as long as they can form inlets and outlets for the fluid.

In the first exemplary embodiment, the openings of the sealing materials and the holes of the case for guiding the fluid into the gaps 111 and 112 are formed at two positions for each of the gaps 111 and 112 to serve as an inlet and an outlet. When air is used as the fluid, however, multiple openings and holes may be formed. Conversely, a sealing material to close the gaps 111 and 112 may be partially formed. In this case, it is not always necessary that the number and positions of the holes of the case and the openings of the sealing materials are equal to each other.

While two gaps are formed on the sides of the TFT substrate 10 and the counter substrate 20, respectively, in FIG. 1, a gap may be formed on only one of the sides.

One of the holes 125 and 126 from which fluid flows in the gap 111 on the side of the TFT substrate 10 and one of the holes 127 and 128 through which the fluid flows in the gap 112 formed on the side of the counter substrate 20 may be connected by a duct to form one channel.

Figure 6:
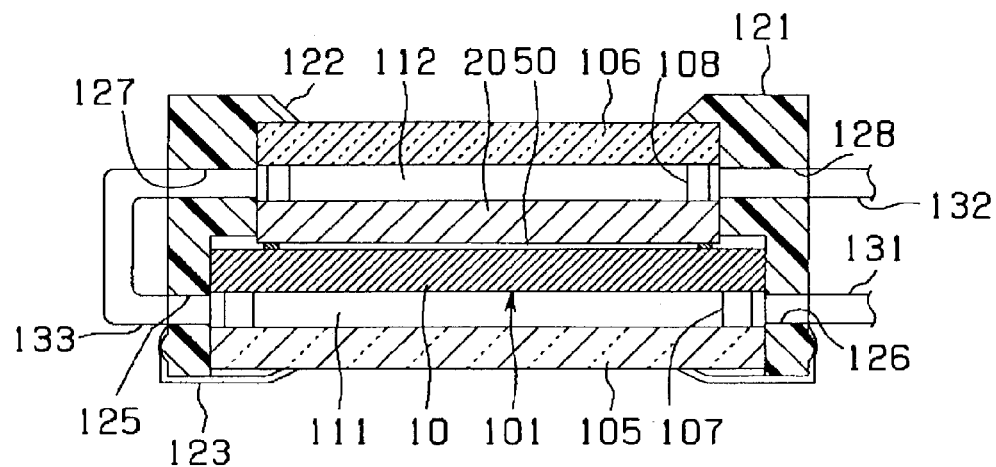
FIG. 6 is a schematic sectional view showing connections of ducts.

FIG. 6 is a schematic sectional view showing this connection with ducts, corresponding to FIG. 1.

In an example shown in FIG. 6, the hole 126 is connected to a duct 131, and the hole 128 is connected to a duct 132. The holes 125 and 127 are connected by a duct 133. Consequently, the gaps 111 and 112 are connected by the duct 133 to form one channel.

In this case, for example, when fluid is poured through the duct 131, it flows into the hole 126, the opening 109', and the gap 111, flows into the duct 133 through the opening 109 and the hole 125, and then flows outside from the duct 132 through the hole 127, the opening 110, the gap 112, the opening 110', and the hole 128.

In such a configuration, since the fluid can be caused to flow through one channel, and the structure of a fluid driving section, such as a pump, can be simplified.

Figure 7:
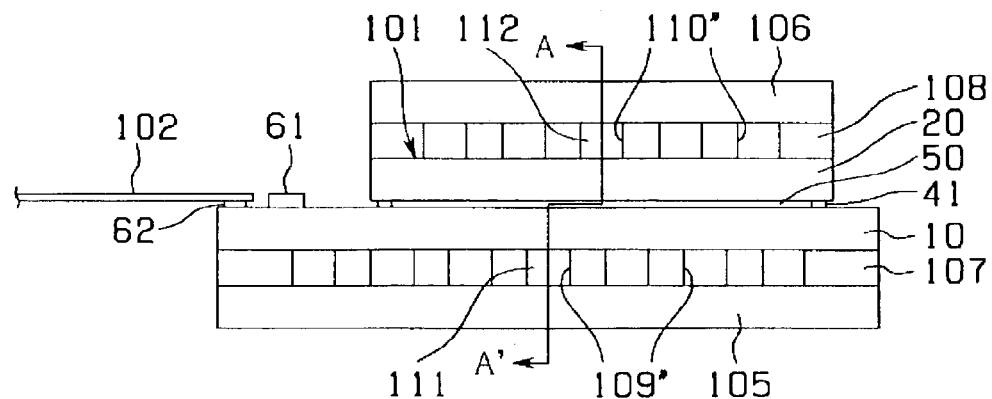
FIG. 7 is a schematic sectional view showing a case in which a plurality of channels for cooling fluid are provided.

FIG. 7 shows an example in which a plurality of channels for cooling fluid are provided. FIG. 7 corresponds to FIG. 5.

As shown in FIG. 7, the sealing material 107 has cutouts at a plurality of positions to form a plurality of openings 109". Similarly, the sealing material 108 has cutouts at a plurality of positions to form a plurality of openings 110".

In a modification of the example shown in FIG. 6 in which the case having the liquid crystal panel assembly shown in FIG. 6 housed therein is provided with holes corresponding to a plurality of openings 110" and a plurality of openings 109", and the openings 110" and the openings 109" and the holes formed in the case are connected in an airtight or watertight manner, cooling similar to that in the first exemplary embodiment can be performed by connecting, to these holes, ducts through which cooling fluid flows, in a manner similar to that in the first exemplary embodiment.

In a case in which the openings 110" and the openings 109", and the holes formed in the case are not connected in an airtight or watertight manner, cooling air is put in through some of these holes to exhaust air flowing in the gap through the other holes. That is, only an input means may be provided, and air may be naturally released.

While the case 121 has the holes 125 to 128 serving as fluid inlets and outlets in this exemplary embodiment, when it is assumed that a gap between the case 121 and the liquid crystal panel assembly is used, it is only necessary to form, in the case 121, at least one hole serving as a fluid inlet and outlet. For example, one hole is formed as a fluid inlet, and fluid flowing from the outside of the case 121 through the hole is supplied into the gaps 111 and 112 through the gap between the case 121 and the liquid crystal panel assembly, and is released outside from the hole of the case through the gap between the case 121 and the liquid crystal panel assembly.

Such a gap between the case 121 and the liquid crystal panel assembly can be obtained by partly applying an adhesive to fix the case and the panel. This is effective, in particular, when air is used as the fluid.

Fluid may be caused to flow in and out through a communicating hole formed at the corner of the case. When liquid is poured through the communicating hole, a duct is connected to the communicating hole. A groove may be formed in the case 121 in order to widen the gap between the case 121 and the liquid crystal panel assembly.

Without forming a new hole in the case, fluid can be caused to flow into and out of the case by using only the gap between the case and the panel.

While the dustproof panels are attached to the TFT-substrate side and the counter-substrate side of the liquid crystal panel in the above embodiment, a dustproof panel may be placed only on one of the light incident and emergent sides of the liquid crystal panel. In this case, the dustproof panel may be attached to any one of the incident and emergent sides.

Figure 8:
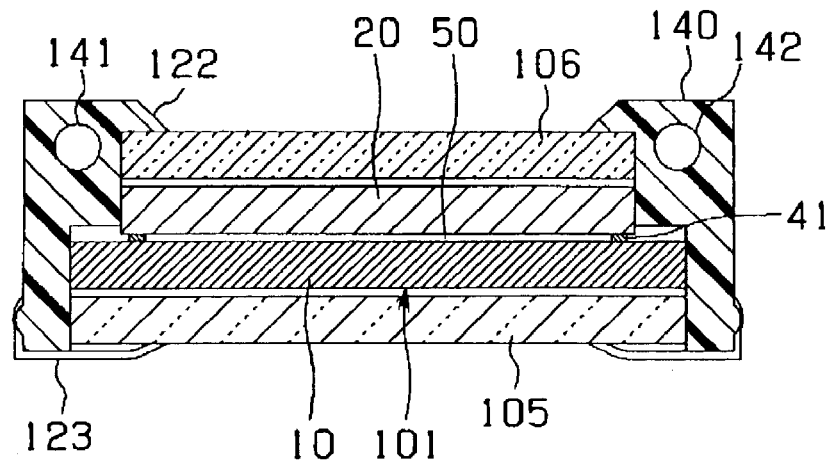
FIG. 8 is a schematic sectional view of a second exemplary embodiment of the present invention.
Figure 9:
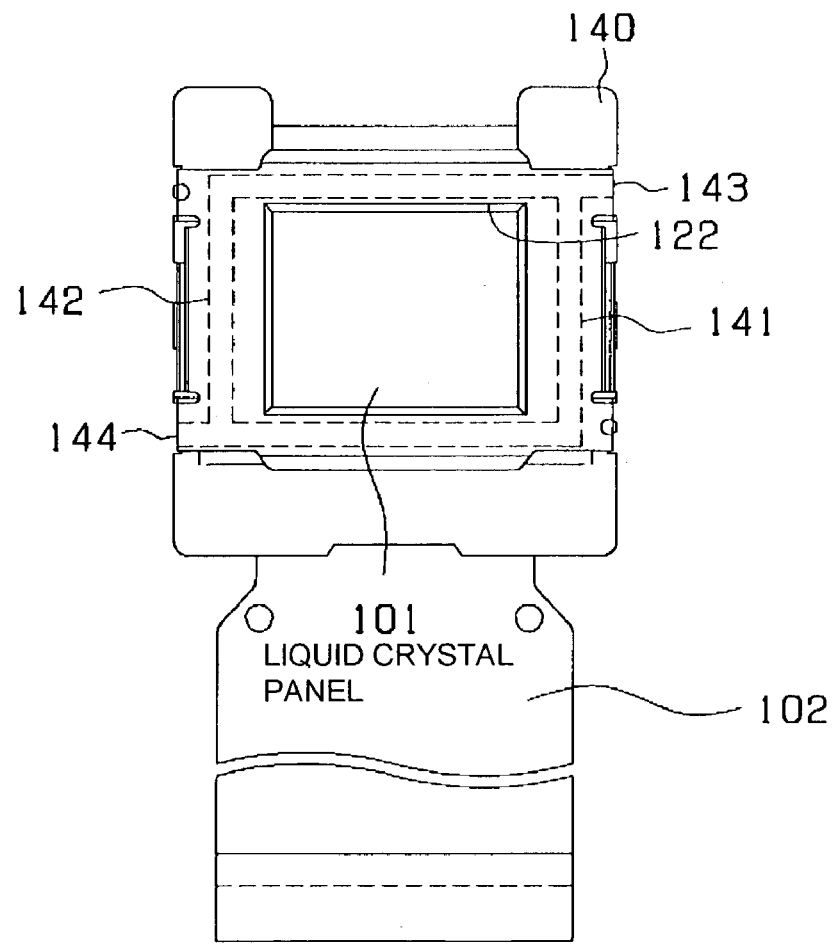
FIG. 9 is a top plan view of a liquid crystal panel module shown in FIG. 8.

FIG. 8 is a schematic sectional view showing a second exemplary embodiment of the present invention. In FIG. 8, the same components as those in FIG. 1 are denoted by the same reference numerals, and descriptions thereof are omitted. FIG. 9 is a top plan view of a liquid crystal panel module shown in FIG. 8.

In the first exemplary embodiment, gaps are formed between the liquid crystal panel and the dustproof panels, and cooling fluid is caused to flow in the gaps, thereby enhancing the cooling effect. In contrast, in this embodiment, a case itself has ducts through which fluid flows.

In FIG. 8, a liquid crystal panel 101 is similar to that shown in FIGS. 2 to 4, and is formed by bonding a TFT substrate 10 and a counter substrate 20 together. An FPC 102 is connected to mounting terminals 62 (see FIG. 3) of the liquid crystal panel 101.

Dustproof panels 105 and 105 are placed on the TFT substrate 10 and the counter substrate 20 of the liquid crystal panel 101. The TFT substrate 10 and the dustproof panel 105 are face-bonded with a transparent adhesive. The counter substrate 20 and the dustproof panel 106 are face-bonded with a transparent adhesive. An assembly composed of the liquid crystal panel 101 and the dustproof panels 105 and 106 is housed in a case 140.

The interior of the case 140 has a shape that almost conforms to the shapes of the dustproof panel 105, the liquid crystal panel 101, and the dustproof panel 106 stacked.

In this exemplary embodiment, the case 140 has a thick region outside the periphery of the counter substrate 20 and the dustproof panel 106, and fluid ducts 141 and 142 are formed along the thick region. The duct 141 is connected to an opening 143 formed at the rear end of a side face of the case 140, and the duct 142 is connected to an opening 144 formed at the front end of a side face of the case 140. The ducts 141 and 142 are connected to each other, and two routes of the ducts 141 and 142 allow the openings 143 and 144 to communicate with each other.

In this exemplary embodiment having such a configuration, fluid that flows from one of the openings 143 and 144 separately flows into the ducts 141 and 142, flows together again, and flows out from the other of the ducts 143 and 144. By letting cooling fluid flow through the openings 143 and 144, the case 140 can be cooled, and the liquid crystal panel 101 and the dustproof panels 105 and 106 housed in the case 140 can also be cooled.

In this way, since the ducts through which cooling fluid flows are formed in the case in this embodiment, the case, and the liquid crystal panel and the dustproof panels inside the case can be cooled with extremely high efficiency.

While the ducts through which cooling fluid flows are formed outside the peripheries of the counter substrate 20 and the dustproof panel 106 in the above embodiment, the fluid ducts may be formed along a thick region formed outside the peripheries of the TFT substrate 10 and the dustproof panel 105. Alternatively, fluid ducts may be formed in upper and lower two positions. While the ducts are connected into one, the fluid may be caused to flow through separate ducts.

Figure 10:
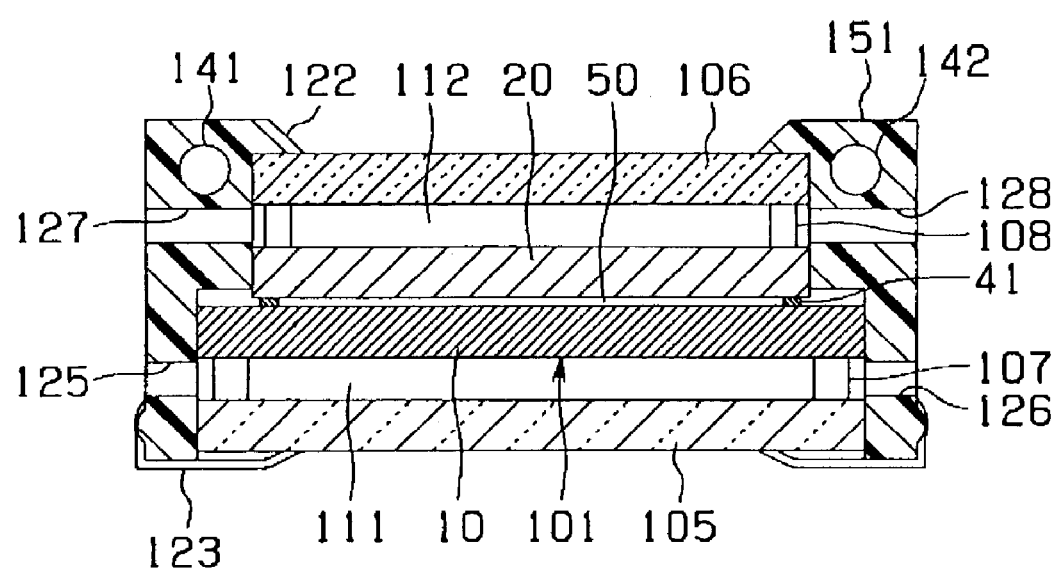
FIG. 10 is a schematic sectional view of a third exemplary embodiment of the present invention.

FIG. 10 is a schematic sectional view showing a third exemplary embodiment of the present invention. In FIG. 10, the same components as those in FIGS. 1 and 8 are denoted by the same reference numerals, and descriptions thereof are omitted.

In this exemplary embodiment, gaps are formed between a liquid crystal panel and dustproof panels so that cooling fluid flows in the gaps, and a case itself has ducts through which the fluid flows.

This exemplary embodiment is a combination of the first and second exemplary embodiments, and is different from the first exemplary embodiment in that a case 151 is used in place of the case 121. The case 151 is formed by adding ducts 141 and 142 to the case 121 shown in FIG. 1. That is, the case 151 has a thick region outside the peripheries of a counter substrate 20 and a dustproof panel 106, in a manner similar to that in the case 140 shown in FIG. 8, and the fluid ducts 141 and 142 are formed along the thick region.

The planar shape of a liquid crystal panel module of this exemplary embodiment is similar to that shown in FIG. 9. An opening 143 similar to that in FIG. 9 is formed at the rear end of a side face of the case 151, and an opening 144 similar to that in FIG. 9 is formed at the front end of a side face thereof. The duct 141 is connected to the opening 143 formed at the rear end of the side face of the case 151, and the duct 142 is connected to the opening 144 formed at the front end of the side face of the case 151. The ducts 141 and 142 are connected to each other, and two routes of the ducts 141 and 142 allow the openings 143 and 144 to communicate with each other.

In this exemplary embodiment having such a configuration, cooling fluid is caused to flow in gaps 111 and 112, in a manner similar to that in the first embodiment, and cooling fluid is caused to flow in the ducts 141 and 142, in a manner similar to that in the second embodiment. This makes it possible to cool the case 151, and a liquid crystal panel 101 and dustproof panels 105 and 106 housed in the case 151 with extremely high efficiency.

By appropriately connecting holes 125 to 128 and the openings 143 and 144 by ducts, the gaps 111 and 112 and the ducts 141 and 142 can be combined into one or two channels. For example, by connecting the duct 131 shown in FIG. 6 to the opening 143 (see FIG. 9), fluid can be caused to flow from the opening 144 into the duct 131 through the ducts 141 and 142 and the opening 143, and the components can be cooled by one channel.

In this way, in this exemplary embodiment, cooling fluid is caused to flow in the gaps between the liquid crystal panel and the dustproof panels and in the ducts inside the case, and therefore, the case, and the liquid crystal panel and the dustproof panels in the case can be cooled with extremely high efficiency.

In this exemplary embodiment, it is also evident that the ducts through which cooling fluid flows may be formed anywhere in the case.

In this exemplary embodiment, it is also evident that the number of holes formed in the case can be reduced to one by using a gap between the case 151 and the liquid crystal panel assembly. Furthermore, the holes may be omitted by using the gap between the case 151 and the liquid crystal panel assembly, as described above.

It is also evident that the liquid crystal panel assembly of this exemplary embodiment may have multiple openings, in a manner similar to that in FIG. 7.

While the dustproof panels are mounted on both the counter substrate and the TFT substrate in the exemplary embodiments and exemplary modifications described above, a dustproof panel may be mounted on one of the substrates.

Figure 11:
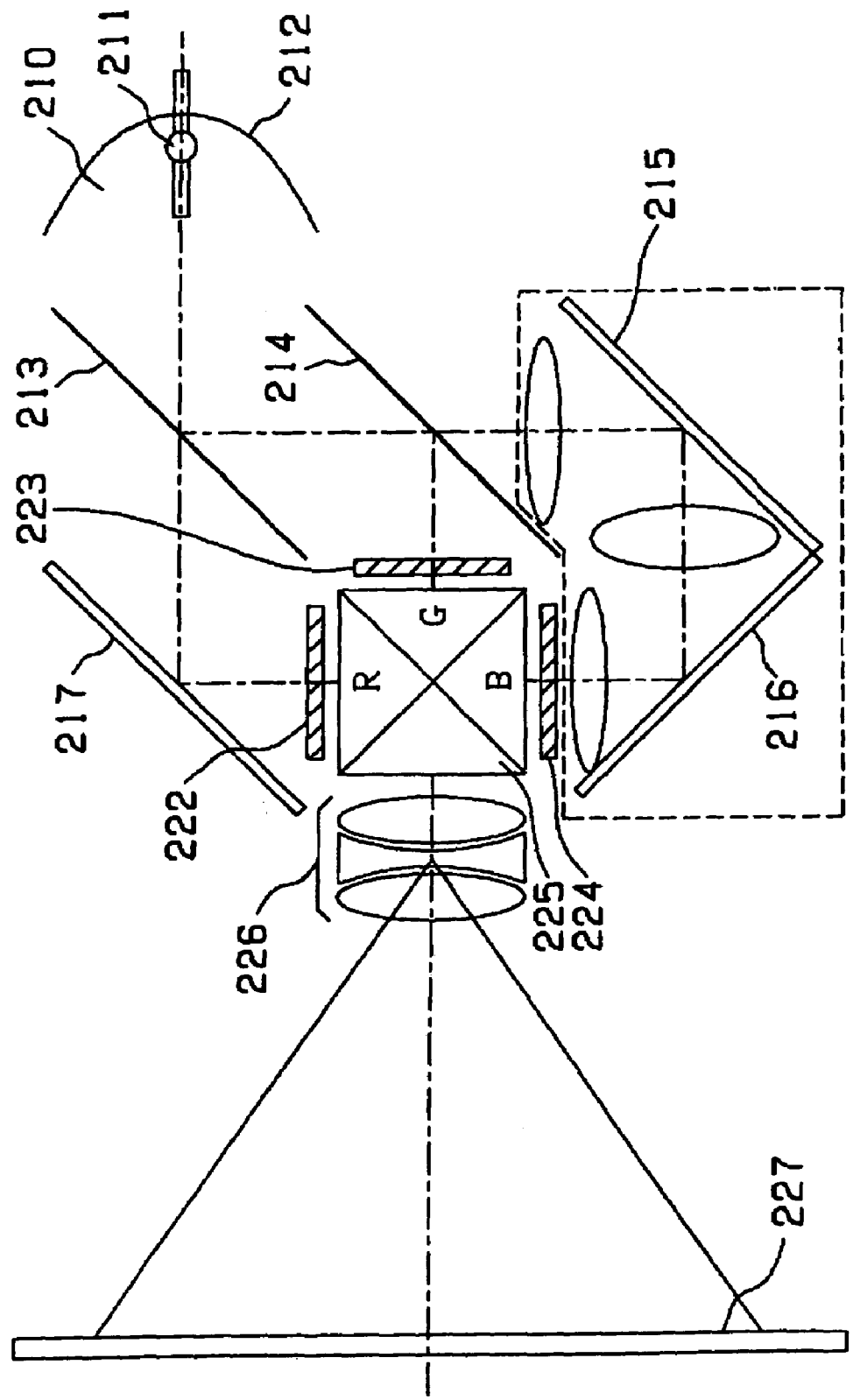
FIG. 11 is a schematic structural view of a fourth exemplary embodiment of the present invention.

FIG. 11 is a schematic structural view showing a fourth exemplary embodiment of the present invention. This exemplary embodiment shows a projection display device using the liquid crystal panel modules produced in the first to third exemplary embodiments.

In FIG. 11, a light source 210 includes a lamp 211, such as a metal halide lamp, and a reflector 212 to reflect light from the lamp 211. A dichroic mirror 213 to reflect blue light and green light, and a reflective mirror 217 are placed on an optical path of light emitted from the light source 210. The dichroic mirror 213 transmits red light of a light beam from the light source 210, and reflects blue light and green light. The reflective mirror 217 reflects red light transmitted through the dichroic mirror 213.

A dichroic mirror 214 to reflect green light and a reflective mirror 215 are placed on an optical path of reflected light from the dichroic mirror 213, and the dichroic mirror 214 reflects green light of incident light and transmits blue light. The reflective mirror 215 reflects transmitted light from the dichroic mirror 214. A reflective mirror 216 is placed on an optical path of reflected light from the reflective mirror 215, and further reflects reflected light (blue light) from the reflective mirror 215.

Liquid crystal panel modules 222, 223, and 224 serving as liquid-crystal optical modulation devices are placed on the optical paths of light from the reflective mirror 217, the dichroic mirror 214, and the reflective mirror 216, respectively. Red light, green light, and blue light enter the liquid crystal panel modules 222 to 224, respectively. The liquid crystal panel modules 222 to 224 optically modulate incident light, according to R, G, and B image signals, respectively, and emit R, G, and B image light to a dichroic prism 225.

The dichroic prism 225 is formed by bonding four rectangular prisms together, and a dielectric multilayer film to reflect red light and a dielectric multilayer film to reflect blue light are formed in cross form on inner surfaces of the prisms. The dichroic prism 225 combines three R, G, and B light components by these dielectric multilayer films, and emits image light for a color image.

A projection lens 226 that constitutes a projection optical system is placed on the optical path of light emitted from the dichroic prism 225, and projects combined image light onto a screen 227. An enlarged image is displayed on the screen 227 in this way.

In the exemplary embodiment having such a configuration, cooling fluid is caused to flow in gaps 111 and 112 (see FIG. 1) of the liquid crystal panel modules 222, 223, and 224, ducts 141 and 142 (see FIG. 8), and so on. The liquid crystal panel modules 222, 223, and 224 are thereby cooled sufficiently.

Therefore, forcible cooling using a cooling fan is unnecessary, operation noise of the cooling fan will not be produced, and the power consumption can be reduced.

As described above, in the present invention, the cooling effect can be enhanced by forming fluid channels.

What is claimed is:

1. A display panel assembly, comprising:
    a display panel having a display surface;
    a first transparent member placed on an incident surface of the display panel and a second transparent member placed on an emergent surface of the display panel, the first transparent member and the second transparent member each having an outer surface facing opposite from the display surface of the display panel; and
    a first gap member including adhesive placed between the display panel and the first transparent member to form a first gap therebetween and a second gap member including adhesive placed between the display panel and the second transparent member to form a second gap therebetween, the display surface of the display panel being separated from an outer surface of each of the first transparent member and the second transparent member
    the first gap and the second gap being connected to form a channel.

2. The display panel assembly according to claim 1, further comprising:
    an adhesive member to bond at least one of the incident surface of the display panel to the first transparent member and the emergent surface of the display panel to the second transparent member.

3. The display panel assembly according to claim 2, the adhesive member being provided on at least one of the periphery of the incident surface and the emergent surface of the display panel, except for a part, to allow the first gap and the second gap to serve as a channel for fluid.

4. The display panel assembly according to claim 3, the first gap and the second gap including two predetermined portions of the adhesive member.

5. The display panel assembly according to claim 3, the part in which the adhesive member is not provided being provided on opposite side faces of the display panel.

6. The display panel assembly according to claim 1, further comprising:
    an antireflection film disposed on the surface of the display panel facing at least one of the first gap and the second gap.

7. The display panel assembly according to claim 1, the first and the second transparent member being composed of a glass material.

8. A display panel case for use with a display panel assembly, comprising:
    a housing section to accommodate the display panel assembly, the display panel assembly including a display panel having a display surface, a first transparent member placed on an incident surface of the display panel and a second transparent member placed on an emergent surface of the display panel, the first transparent member and the second transparent member each having an outer surface facing opposite from the display surface of the display panel, and a first gap member placed between the display panel and the first transparent member to form a first gap therebetween, a second gap member placed between the display panel and the second transparent member to form a second gap therebetween, the display surface of the display panel being separated from an outer surface of the first transparent member and the second transparent member; and a first hole and a second hole each formed in the housing section respectively bringing the first gap and the second gap in the display panel assembly into fluid communication with the outside, the first gap and the second gap being connected to form a channel.

9. A display panel case for use with a display panel assembly, comprising:

a housing section to accommodate the display panel assembly, the display panel assembly including a display panel having a display surface, a first transparent member placed on an incident surface of the display panel and a second transparent member placed on an emergent surface of the display panel, the first transparent member and the second transparent member each having an outer surface facing opposite from the display surface of the display panel, a first gap member placed between the display panel and the first transparent member to form a first gap therebetween, a second gap member placed between the display panel and the second transparent member to form a second gap therebetween, the display surface of the display panel being separated from an outer surface of the first transparent member and the second transparent member, and an adhesive member to bond at least one of the incident surface of the display panel to the first transparent member and the emergent surface of the display panel to the second transparent member, the adhesive member being provided on at least one of the periphery of the incident surface and the emergent surface of the display panel, except for a part, to allow the first gap and the second gap to serve as a channel for fluid, the first gap and the second gap being connected to form the channel; and a plurality of holes formed in the housing section to allow the first gap and the second gap to communicate with the outside through the part of the display panel assembly in which the adhesive member is not provided.

10. A display panel module, comprising:

a display panel assembly including a display panel having a display surface, a first transparent member placed on an incident surface of the display panel and a second transparent member placed on an emergent surface of the display panel, the first transparent member and the second transparent member each having an outer surface facing opposite from the display surface of the display panel, and a first gap member placed between the display panel and the first transparent member to form a first gap therebetween, a second gap member placed between the display panel and the second transparent member to form a second gap therebetween, the display surface of the display panel being separated from an outer surface of the first transparent member and the second transparent member; and a display panel case including a housing section to accommodate the display panel assembly, and at least one hole formed in the housing section bringing the first gap and the second gap provided in the display panel assembly into fluid communication with the outside, the first gap and the second gap being connected to form a channel.

11. A display panel module, comprising:

a display panel assembly including a display panel having a display surface, a first transparent member placed on an incident surface of the display panel and a second transparent member placed on an emergent surface of the display panel, the first transparent member and the second transparent member each having an outer surface facing opposite from the display surface of the display panel, a first gap member placed between the display panel and the first transparent member to form a first gap therebetween, a second gap member placed between the display panel and the second transparent member to form a second gap therebetween, the display surface of the display panel being separated from an outer surface of the first transparent member and the second transparent member, and an adhesive member to bond at least one of the incident surface of the display panel to the first transparent member and the emergent surface of the display panel to the second transparent member, the adhesive member being provided on at least one of the periphery of the incident surface and the emergent surface of the display panel, except for a part, to allow the first gap and the second gap to serve as a channel for fluid; and a display panel case including a housing section to accommodate the display panel assembly, and a plurality of holes formed in the housing section to allow the first gap and the second gap to communicate with the outside through the part of the display panel assembly in which the adhesive member is not provided, the first gap and the second gap being connected to form the channel.

12. A display panel case, comprising:

a housing section to accommodate a display panel;

a plurality of openings formed on an outer surface of the housing section; and at least one duct disposed in a thick portion of the housing section to form a predetermined channel, and connected at both ends to the openings.

13. The display panel case according to claim 12, the duct being provided on the periphery of the display panel.

14. A display panel case for use with a display panel assembly, comprising:

a housing section to accommodate the display panel assembly, the display panel assembly including a display panel, a transparent member placed on at least one of an incident surface and an emergent surface of the display panel, and a gap member placed between at least one of the display panel and the transparent member to form a gap therebetween;

a hole formed in the housing section to allow the gap provided in the display panel assembly to communicate with the outside;

a plurality of openings formed on an outer surface of the housing section; and at least one duct disposed in a thick portion of the housing section to form a predetermined channel, and connected at both ends to the openings.

15. A display panel case for use with a display panel assembly, comprising:

a housing section for accommodating the display panel assembly, the display panel assembly including a display panel, a transparent member placed on at least one of an incident surface and an emergent surface of the display panel, a gap member placed between at least one of the display panel and the transparent member to form a gap therebetween, and an adhesive member to bond at least one of the incident surface and the emergent surface of the display panel to the transparent member, the adhesive member being provided on at least one of the periphery of the incident surface and the emergent surface of the display panel, except for a part, to allow the gap to serve as a channel for fluid;

a plurality of holes formed in the housing section to allow the gap to communicate with the outside through the part of the display panel assembly in which the adhesive member is not provided;

a plurality of opening formed on an outer surface of the housing section; and at least one duct disposed in a thick portion of the housing section to form a predetermined channel, and connected at both ends to the openings.

16. A display panel module, comprising:

a display panel assembly including a display panel, a transparent member placed on at least one of an incident surface and an emergent surface of the display panel, and a gap member placed between at least one of the display panel and the transparent member to form a gap therebetween; and a display panel case including a housing section to accommodate the display panel assembly, a hole formed in the housing section to allow the gap provided in the display panel assembly to communicate with the outside, a plurality of openings formed on an outer surface of the housing section, and at least one duct disposed in a thick portion of the housing section to form a predetermined channel, and connected at both ends to the openings.

17. A display panel module, comprising:

a display panel assembly including a display panel, a transparent member placed on at least one of an incident surface and an emergent surface of the display panel, a gap member placed between at least one of the display panel and the transparent member to form a gap therebetween, and an adhesive member to bond at least one of the incident surface and the emergent surface of the display panel to the transparent member, the adhesive member being provided on at least one of the periphery of the incident surface and the emergent surface of the display panel, except for a part, to allow the gap to serve as a channel for fluid; and a display panel case including a housing section to accommodate the display panel assembly, a plurality of holes formed in the housing section to allow the gap to communicate with the outside through the part of the display panel assembly in which the adhesive member is not provided, a plurality of opening formed on an outer surface of the housing section, and at least one duct disposed in a thick portion of the housing section to form a predetermined channel, and connected at both ends to the openings.

18. A cooling method for a display panel module that includes a display panel having a display surface, a first transparent member placed on an incident surface of the display panel and a second transparent member placed on an emergent surface of the display panel, the first transparent member and the second transparent member each having an outer surface facing opposite from the display surface of the display panel, and a first gap member placed between the display panel and the first transparent member to form a first gap therebetween, a second gap member placed between the display panel and the second transparent member to form a second gap therebetween, the display surface of the display panel being separated from an outer surface of the first transparent member and the second transparent member, and a display panel case including a housing section to accommodate the display panel assembly, and at least one hole formed in the housing section bringing the first gap and the second gap provided in the display panel assembly into fluid communication with the outside, the first gap and the second gap being connected to form a channel, the method comprising:

cooling the display panel module by enabling liquid to flow into the display panel module, the liquid having a refractive index corresponding to the refractive index of the transparent member that constitutes the display panel assembly.

19. A cooling method for a display panel module that includes a display panel assembly including a display panel having a display surface, a first transparent member placed on an incident surface of the display panel and a second transparent member placed on an emergent surface of the display panel, the first transparent member and the second transparent member each having an outer surface facing opposite from the display surface of the display panel, a first gap member placed between the display panel and the first transparent member to form a first gap therebetween, a second gap member placed between the display panel and the second transparent member to form a second gap therebetween, the display surface of the display panel being separated from an outer surface of the first transparent member and the second transparent member, and an adhesive member to bond at least one of the incident surface of the display panel to the first transparent member and the emergent surface of the display panel to the second transparent member, the adhesive member being provided on the periphery of at least one of the incident surface and the emergent surface of the display panel, except for a part, to allow the first gap and the second gap to serve as a channel for fluid, and a display panel case including a housing section to accommodate the display panel assembly, and a plurality of holes formed in the housing section to allow the first gap and the second gap to communicate with the outside through the part of the display panel assembly in which the adhesive member is not provided, the first gap and the second gap being connected to form the channel, the method comprising:

cooling the display panel module by enabling liquid to flow into the display panel module, the liquid having a refractive index corresponding to the refractive index of the transparent member that constitutes the display panel assembly.

20. A projection display device, comprising:

an image forming device that includes a display panel module, the display panel module including:

a display panel assembly including a display panel having a display surface, a first transparent member placed on an incident surface of the display panel and a second transparent member placed on an emergent surface of the display panel, the first transparent member and the second transparent member each having an outer surface facing opposite from the display surface of the display panel, and a first gap member placed between the display panel and the first transparent member to form a first gap therebetween, a second gap member placed between the display panel and the second transparent member to form a second gap therebetween, the display surface of the display panel being separated from an outer surface of the first transparent member and the second transparent member; and a display panel case including a housing section to accommodate the display panel assembly, and a hole formed in the housing section bringing the first gap and the second gap provided in the display panel assembly into fluid communication with the outside, the first gap and the second gap being connected to form a channel.

21. A projection display device, comprising:
an image forming device that includes a display panel module, the display panel module including:
  a display panel assembly including a display panel having a display surface, a first transparent member placed on an incident surface of the display panel and a second transparent member placed on an emergent surface of the display panel, the first transparent member and the second transparent member each having an outer surface facing opposite from the display surface of the display panel, a first gap member placed between the display panel and the first transparent member to form a first gap therebetween, a second gap member placed between the display panel and the second transparent member to form a second gap therebetween, the display surface of the display panel being separated from an outer surface of the first transparent member and the second transparent member, and an adhesive member to bond at least one of the incident surface of the display panel to the first transparent member and the emergent surface of the display panel to the second transparent member, the adhesive member being provided on at least one of the periphery of the incident surface and the emergent surface of the display panel, except for a part, to allow the first gap and the second gap to serve as a channel for fluid; and
  a display panel case including a housing section to accommodate the display panel assembly, and a plurality of holes formed in the housing section to allow the first gap and the second gap to communicate with the outside through the part of the display panel assembly in which the adhesive member is not provided, the first gap and the second gap being connected to form the channel.

22. A display panel module, comprising:
a display panel;
a frame that supports the display panel;
at least one duct disposed within the frame; and
at least one gap disposed within the display panel, the duct and the gap being connected to form a channel.

23. A display panel module, comprising:
a display panel assembly including a display panel;
a transparent member placed on at least one of an incident surface and an emergent surface of the display panel;
at least one gap member placed between at least one of the display panel and the transparent member to form a gap therebetween;
a display panel case including a housing section to accommodate the display panel assembly,
the housing section including at least one aperture to allow fluid communication between the gap provided in the display panel assembly and the outside;
at least one opening formed on an outer surface of the housing section; and
at least one duct disposed in a portion of the housing section to form a predetermined channel, the duct capable of fluid communication with at least one opening.

24. A display panel module, comprising:
a display panel assembly including a display panel;
a transparent member placed on at least one of an incident surface and an emergent surface of the display panel;
at least one gap member placed between at least one of the display panel and the transparent member to form a gap therebetween;
an adhesive member to bond at least one of the incident surface and the emergent surface of the display panel to the transparent member, the adhesive member being provided on at least one of the periphery of the incident surface and the emergent surface of the display panel, except for a part, to allow the gap to serve as a channel for fluid; and
a display panel case including a housing section to accommodate the display panel assembly,
  the housing section including at least one aperture to allow fluid communication between the at least one gap and the outside through the part of the display panel assembly in which the adhesive member is not provided;
  at least one opening formed on an outer surface of the housing section; and
  at least one duct disposed in a portion of the housing section to form a predetermined channel, the duct capable of fluid communication with at least one opening.

* * * * *